July 30, 1929.   O. HEINISCH ET AL   1,722,419

SYSTEM FOR THE DISTRIBUTION OF ELECTRIC ENERGY

Filed Nov. 2, 1925

Otto Heinisch,
Anton Riedl
by C. P. Goepel
their Attorney.

Patented July 30, 1929.

1,722,419

UNITED STATES PATENT OFFICE.

OTTO HEINISCH, OF WESEL, AND ANTON RIEDL, OF CLEVE-RHINELAND, GERMANY.

SYSTEM FOR THE DISTRIBUTION OF ELECTRIC ENERGY.

Application filed November 2, 1925, Serial No. 66,127, and in Germany November 29, 1924.

Our invention relates to improvements in systems for the distribution of electric energy, and more particularly to apparatus used in the said systems for preventing injury to persons and apparatus in case of breakage of leads or other parts of the system. In systems now in use some of the parts are grounded either directly or through neutral wires, transformers are provided for reducing the voltage, and the leads have been carefully insulated for preventing injury to persons and apparatus. However, these methods are not universally satisfactory and some of them are so expensive that they cannot be generally used in house systems. The object of the improvements is to provide a system for the distribution of electric energy, by which, in case of a defect of any kind, the house system is automatically switched out so as to prevent injury to man or beast and destruction of lamps, motors and other apparatus.

With this object in view our invention consists in insulating the phase wires and the neutral wire and disposing the same within a metal pipe or jacket, and connecting the said pipe or jacket with the neutral wire through a lead including the electromagnet of a cut-out switch adapted to disconnect the phase wires as well as the neutral wire from the supply system whenever a comparatively weak current flows through the said lead to the neutral wire. Preferably the motor casings, switch apparatus and other devices are electrically connected with the said jacket or pipe, so that whenever current passes to the said apparatus the same effect is produced as in case of an admission of current to the jacket. By our improved system so far described many defects are made harmless by directly switching out the house system. However to render the said safety apparatus operative as against any defects of the system, we provide a resistance in the neutral wire at the rear of the switch, which resistance is equal to the resistance of the coil of the said electromagnet controlling the switch, and we mount the whole safety apparatus within a casing insulated as against the said metallic jacket or pipe. Preferably the switch is constructed so as to operate as a maximum cut-out and as a main switch. Preferably it is constructed in the form of a free cutout switch. In this case the switch apparatus can be used in lieu of the inlet boxes now in use. The cost of the system does not exceed the cost of the system now in use, but it is absolutely safe.

In a modification the system is further improved and made more simple by adding a maximum coil of the neutral wire to the automatic switch, in addition to the maximum coils of the phase wires, in which case it is sufficient to provide two phase coils, the said two phase coils being sufficient for all cases. The maximum coil of the neutral wire can be used in lieu of the resistance, if its resistance is substantially equal to that of the coil included between the neutral wire and the metal jacket.

The construction of the safety system includes various important features. At first, the general arrangement of the system is simple, because a resistance is dispensed with, and instead of a phase coil a neutral wire coil is used, which is more simple. The fact that a phase coil may be omitted will be understood, because in case of a breakdown between two phases in any case a maximum coil is disposed in the circuit, and in case of a break-down between the phase having no coil and the neutral wire the coil of the neutral wire operates the switch.

The effect of the system is improved. The neutral wire, which ordinarily in house systems is not protected, is protected in our system by its coil, which coil simultaneously has the function of preventing an overcharge between a phase and the neutral wire, because it is adapted to the maximum load of the neutral wire allowed in the system.

For the purpose of explaining the invention two examples embodying the same have been shown in the accompanying drawing.

In said drawing.

Figure 1:
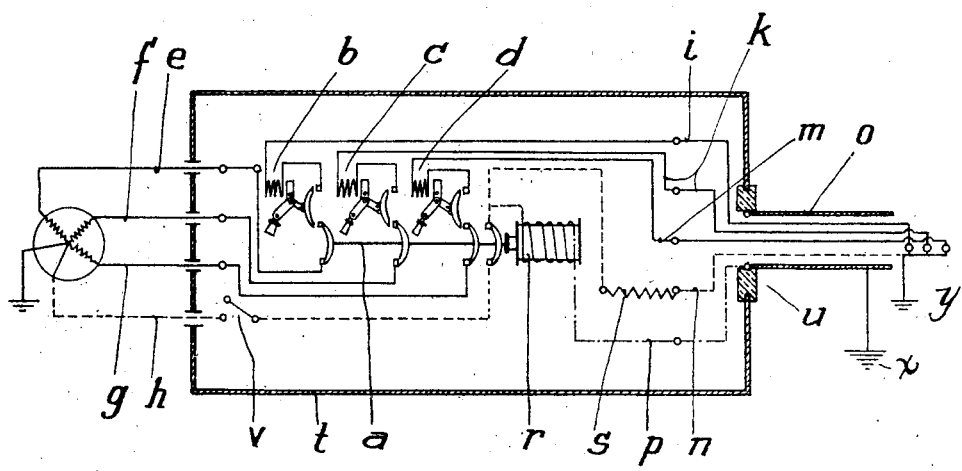
Fig. 1, is a diagrammatical view showing the system.

In the apparatus shown in Fig. 1, a switch $a$ is represented as having four poles, three of which are arranged to cooperate with the circuit breakers for overloads, $b$, $c$ and $d$, respectively, and with the terminals of the phase wires $e$, $f$ and $g$, respectively, while the fourth pole cooperates with a neutral line comprising the neutral wires $h$ and $n$. The phase wires $e$, $f$ and $g$ and the neutral wire $h$ lead from a suitable source of power. Connected to the coils of the circuit breakers $b$, $c$ and $d$ are phase wires $i$, $k$ and $m$, respectively, which wires together with the neutral wire $n$ may constitute the wiring of the house system, and, according to our invention these wires are all disposed within a metal conduit or sheath $o$ which is grounded as at $x$.

The switch is controlled by an electromagnet $r$, one terminal of the winding of which is connected to a lead $p$, the opposite terminal of which lead is also grounded as at $y$ so as to establish electrical connection with the conduit $o$. The switch is operated by the said electromagnet for interrupting the circuit when a comparatively small current flows through the same. The neutral wire $n$ is connected through a resistance $s$ to the winding, which resistance is substantially equal to the resistance of the winding $r$. The whole switch apparatus is included within a casing $t$, which is insulated from the pipe or jacket $o$, as is shown at $u$. The neutral wire $h$ includes a device such as a push button $v$.

The operation of the improved system will now be described by showing the operation thereof in case of different defects.

*Example 1.*—In case of a break-down between the neutral wire and a phase wire one of the circuit breakers $b$, $c$, $d$ becomes operative so as to open the circuit. The coil $r$ becomes operative in the same way, because a potential difference is produced between the neutral wire and the earth, and accordingly between the neutral wire and the conduit or sheath $o$, so that current flows through the coil $r$. Thus the system is protected in a double sense, for the electromagnet will be operated by any excess current passing thereto through the resistance $s$ or by a slight current passing thereto from the conduit over the lead $p$.

*Example 2.*—If one of the phase wires is grounded or connected to a body having connection with the earth, a current flows from the defective part of the system through the conduit $o$ and the coil $r$ to the neutral wire, the casings of the motors and other parts being connected with the conduit $o$. Thus the switch is operated by the energization of the coil $r$.

*Example 3.*—If the neutral wire of the circuit is interrupted, an accident might be caused by the depending end of the broken neutral wire receiving voltage from a phase wire through a lamp or the like. In this case current flows through the coil $r$ to the conduit $o$, the earth and the star point of the transformer, so that the switch disconnects the house system from the circuit. Thus the lamps and other apparatus connected to the neutral wire are protected from destruction when overloaded, and injury to man or beast is prevented. The switch may be constructed so that the coil $r$ interrupts the circuit even if the current caused to flow through the coil $r$ by connecting a lamp between a phase and the broken neutral wire is not more than 0.1 ampere.

Therefore the key $v$ enables even an inexperienced man to open the main switch and ascertain whether or not the safety apparatus is operative. When interrupting the neutral wire by means of the said key the switch $a$ is operated if at least one lamp is connected to the house system, for if there is only one lamp in the house system the electromagnet will be operated if a fault occurs in the circuit for that lamp so that the electromagnet, thus being already operated and the neutral wire interrupted thereby, cannot be operated by closing a current therethrough upon operating the key $v$. On the other hand, if the current for the single lamp is without fault, the electromagnet can be operated by means of the key $v$.

*Example 4.*—If the neutral wire of the house system is broken, and the broken end is not connected with a lamp, motor casing or the like, no harm can be done. If however, there is such a connection, and if further there is a connection for example between the broken part of the wire with the conduit, dangerous currents can be produced. However, in this case the house system is directly disconnected from the circuit.

A current flows from the phase wire, either directly or through current consuming apparatus, to the broken part of the neutral wire and from the latter through the conduit $o$, the lead $p$ and the coil $r$ to the non-broken part of the neutral wire and further to the star point of the transformer. If both ends of the broken wire make contact with the conduit, or if the non-broken part of the neutral wire has electrical connection with the wire, for example by reason of defective insulation, the resistance $s$ prevents the current from flowing to the non-broken part of the neutral wire without flowing through the coil $r$, when the neutral wire is connected with the conduit. As the resistance $s$ is equal to the resistance of the coil $r$, one half of the current flows through the coil.

If one of the phase wires $e$, $f$, $g$ is electrically connected with the casing $t$ of the switch, the switch $a$ would be opened, if there were no insulation at $u$, but notwithstanding this there would be a potential difference between the jacket $o$ and the earth because in this case the electrical connection is made before the switch. Such electrical connection at the said part can easily be prevented by effectual insulation of the short wire ends $e$, $f$, $g$ within the casing $t$. But for preventing under any circumstances, in case of the said electrical connection the whole system o from being put under electrical tension, we separate the casing t from the conduit o by the insulation u.

Figure 2:
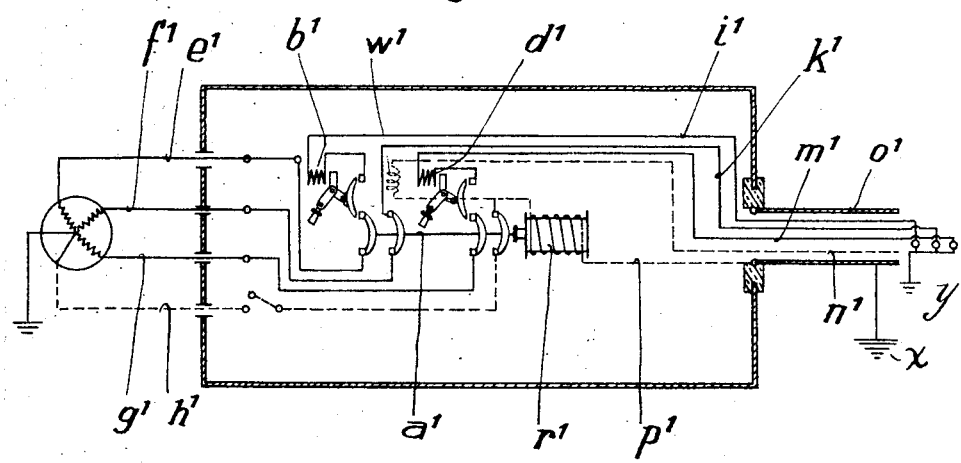
Fig. 2, is a similar view showing a modification.

In the modification shown in Fig. 2 the three phase wires e', f', g' and the neutral wire h' are connected to a four pole switch a' connected with house phase wires i', k', m' and neutral wire n'. The said house wires are mounted within a metal conduit or sheath o' connected with the neutral wire n' through a lead p' and the coil r' of an electromagnet.

The switch a' comprises two phase coils b' and d' included in the wires i' and m', and the third-phase wire k' is directly connected to its switch terminal. Instead of the coil c shown in Fig. 1, the switch a' of the examples shown in Fig. 2 comprises a neutral wire coil w' having substantially the same resistance as the coil r'. The function of the system is the same as that described with reference to Fig. 1. Upon any defect, such for example as break-down between two phases, break-down between a phase wire and the neutral wire, earth or body connection of a phase wire, interruption of a neutral wire of the net or house system, the switch a' disconnects the house system from the circuit. In addition, also the neutral wire itself is protected, and it is impossible to include more apparatus between a phase and the neutral wire than is allowed, because in case of an excessive current intensity in the neutral wire the coil w' opens the switch a'.

The sheath or conduit o thus acts as an additional uninsulated conductor extending along the phase wires and neutral wires to permit connection therewith of the lead p.

We claim:

1. A system for the distribution of electric energy, comprising phase wires, an insulated neutral wire, an automatic cut-out switch to interrupt the flow of current through said wires, an electromagnet for operating the cut-out switch, a resistance substantially equal to the resistance of the coil of the electromagnet included in the neutral wire, a lead including said electromagnet, connected at one end with said neutral wire, and a conductor extending along the phase and neutral wires to which the other end of said lead is connected.

2. A system for the distribution of electric energy, comprising phase wires, an insulated neutral wire, an automatic cut-out switch to interrupt the flow of current through the wires, an electromagnet for operating the cut-out switch, a lead including said electromagnet and connected at one end with said neutral wire, a conductor extending along said phase wires and said neutral wire to which the other end of said lead is connected, and a manually controlled cut-out included in said neutral wire, by the manipulation of which the device may be tested for faulty operation.

3. A system for the distribution of electric energy, comprising phase wires, an insulated neutral wire, an electromagnetically controlled cut-out to interrupt the flow of current through the phase wires and the neutral wire, and a lead including the electromagnet of the cut-out connected at one end with said neutral wire, and a conductor extending along the phase and neutral wires to which the other end of said lead is connected.

4. A system for the distribution of electric energy, comprising phase wires, an insulated neutral wire, a cut-out to interrupt the flow of current through the phase wires and the neutral wire, an electromagnet for operating the cut-out, a lead including said electromagnet connected at one end with said neutral wire, a conductor extending along the phase wires and neutral wire to which the other end of the lead is connected, and a resistance in the neutral wires substantially equal to that of said electromagnet.

5. A system for the distribution of electric energy, comprising phase wires, an insulated neutral wire, a cut-out for interrupting the flow of current through the phase wires and the neutral wire, an electromagnet for operating the cut-out, a lead including said electromagnet and connected at one end with said neutral wire, a conductor extending along the phase wires and neutral wire to which the other end of the lead is connected, and a resistance substantially equal to that of the electro-magnet interposed between the point of connection of electro-magnet to the neutral wire and its distribution terminal whereby in case of a short circuit the resistance will retard the flow of current sufficiently to cause the electro-magnet to operate the cut-out.

In testimony whereof we hereunto affix our signatures.

OTTO HEINISCH.
ANTON RIEDL.